United States Patent
Attride et al.

(10) Patent No.: US 8,186,015 B2
(45) Date of Patent: May 29, 2012

(54) SELF-CONTAINED FLOATING SHAFT HINGE MECHANISM

(75) Inventors: Roy R. Attride, Raleigh, NC (US); John Thomas Sadler, Wake Forest, NC (US)

(73) Assignee: Sony Mobile Communications AB, Lund (SE)

( * ) Notice: Subject to any disclaimer, the term of this patent is extended or adjusted under 35 U.S.C. 154(b) by 1743 days.

(21) Appl. No.: 11/239,588

(22) Filed: Sep. 29, 2005

(65) Prior Publication Data

US 2007/0067956 A1    Mar. 29, 2007

(51) Int. Cl.
*E05F 1/08*    (2006.01)
(52) U.S. Cl. ............................................ 16/303; 16/304
(58) Field of Classification Search ............ 16/303, 16/304
See application file for complete search history.

(56) References Cited

U.S. PATENT DOCUMENTS

| | | | | |
|---|---|---|---|---|
| 4,215,449 | A * | 8/1980 | Loikitz | 16/50 |
| 5,704,094 | A * | 1/1998 | Hartigan et al. | 16/303 |
| 5,966,776 | A * | 10/1999 | Ona | 16/328 |
| 5,996,178 | A * | 12/1999 | Murray | 16/303 |
| 6,115,886 | A * | 9/2000 | Fujita | 16/330 |
| 6,808,402 | B2 * | 10/2004 | Ryu et al. | 439/165 |
| 6,920,668 | B2 * | 7/2005 | Hayashi | 16/303 |
| 6,950,686 | B2 * | 9/2005 | Won | 455/575.3 |
| 7,031,466 | B2 * | 4/2006 | Lu et al. | 379/433.13 |
| 7,100,244 | B2 * | 9/2006 | Qin et al. | 16/330 |
| 7,171,247 | B2 * | 1/2007 | Han | 455/575.3 |
| 2002/0160727 | A1 * | 10/2002 | Won | 455/90 |
| 2004/0177477 | A1 * | 9/2004 | Hsieh | 16/303 |
| 2004/0244147 | A1 | 12/2004 | Qin et al. | |

FOREIGN PATENT DOCUMENTS

| | | |
|---|---|---|
| EP | 1528756 | 5/2005 |
| WO | WO 03/019804 | 3/2003 |

OTHER PUBLICATIONS

PCT International Search Report, International Application No. PCT/US2006/017975, Mailed Oct. 27, 2006.

* cited by examiner

*Primary Examiner* — Victor Batson
*Assistant Examiner* — Jeffrey O Brien
(74) *Attorney, Agent, or Firm* — Coats & Bennett, P.L.L.C.

(57) ABSTRACT

A hinge mechanism pivotally connects first and second housings of an electronics device. The hinge includes a bracket, a floating shaft, a cam member, and a biasing system. The cam member is mounted on the floating shaft. The biasing system is disposed within the first housing, and includes one or more biasing members that allow the cam member and the floating shaft to move axially in a first direction. The one or more biasing members also bias the cam member and the floating shaft in a second, opposing direction. Biasing the floating shaft and the cam member in the second direction maintains the pivotable connection between the first and second housings, and generates the force necessary to yieldingly resist a user pivoting at least one of the first and second housings.

8 Claims, 7 Drawing Sheets

SELF-CONTAINED FLOATING SHAFT HINGE MECHANISM

BACKGROUND

The present invention relates generally to hinge mechanisms for electronics devices, and more particularly to hinge mechanisms for clamshell-type electronics devices.

Manufacturers of clamshell-type electronics devices typically employ one or more hinge mechanisms that pivotally connect the two sides or "flips" of the device. One example of such a device is a "flip" phone. With these types of phones, a hinge pivotally connects a flip that includes a display to another flip that includes a user interface. In general, a user pivots the flips relative to each other to move the flips between "open" and "closed" positions. Other types of electronics devices, such as laptop and notebook computers, for example, also use these types of hinges.

Structurally, most conventional hinges are comprised of a number of very small components that are difficult for humans to manipulate efficiently. This can be problematic during the manual labor phases of the assembly of the electronics device. In addition, manufacturers generally need to stock a large number of these small components to facilitate fast assembly of both the hinge and the electronics device. Thus, conventional hinge designs can lead to increased manufacturing costs, which are passed on to consumers.

SUMMARY

The present invention comprises a hinge mechanism that pivotally connects the two housings of an electronics device. The hinge mechanism comprises a pivot mechanism disposed at least partially within a first housing and a bracket fixedly attached to a second housing. The pivot mechanism connects to the bracket to pivotably connect the first and second housings.

According to one embodiment of the present invention, the pivot mechanism includes a floating shaft that connects to the bracket, a cam member engaged with the floating shaft, and a biasing system engaged with the floating shaft. The biasing system allows for the axial movement of the floating shaft and the cam member in first and second directions. By way of example, the biasing system compresses to allow the cam member and the floating shaft to move axially within the first housing. This allows the user to pivotably attach the first housing to the second housing during assembly. Once assembled, the biasing system biases the cam member and the floating shaft in the second direction.

Biasing the cam member and the floating shaft in the second direction maintains the pivotable connection between the first and second housings. Particularly, the biasing system biases the floating shaft such that one end of the floating shaft remains in pivotable contact with the bracket. The biasing system also provides the biasing force necessary to yieldingly resist a user pivoting the first and second housings. In one embodiment, for example, the biasing system biases the cam member such that a detent formed on the cam member contacts a detent formed on the bracket. When the user pivots the first or second housings, the detents resist the pivoting movement, but yield when the user applies a predetermined amount of force.

DETAILED DESCRIPTION

Figure 1:
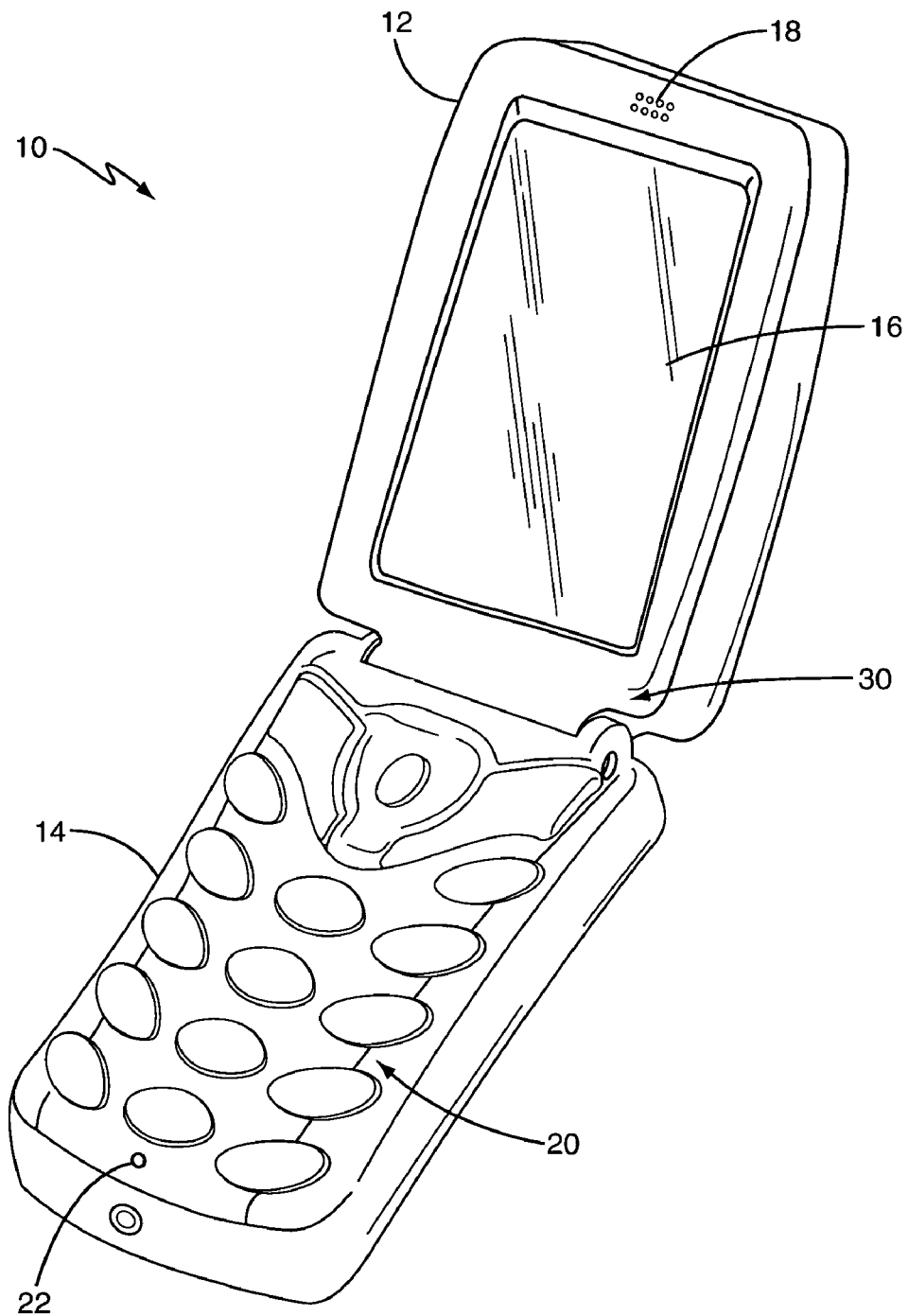
FIG. 1 illustrates an electronics device suitable for use with one embodiment of the present invention.

The present invention comprises a hinge mechanism that pivotably connects the two housings of an electronics device. FIG. 1, for example, illustrates one embodiment of the present invention included in a cellular telephone. Cellular telephone 10 comprises a first housing 12 pivotably connected to a second housing 14 by a hinge mechanism 30. The hinge mechanism 30 allows the first and second housings 12, 14, to pivot "open" and "closed" relative to one another. As described in more detail below, the hinge mechanism 30 also provides a biasing force that permits a portion of the hinge mechanism 30 to move axially within the first housing 12. The axial movement operates a detent mechanism that yieldingly resists against a user opening and closing the first and second housings 12, 14, and also facilitates assembly of the cellular telephone 10.

The first and second housings 12, 14 include, inter alia, a display 16, a speaker 18, a user interface 20, and a microphone 22. Cellular telephone 10 also typically includes communications circuitry (not shown) within the first and/or second housings 12, 14 to allow users to communicate with remote parties via a wireless communications network (not shown). Generally, such circuitry includes one or more microprocessors, memory, and long-range and/or short-range transceivers that operate according to any known standard. Suitable standards include, for example, the Global System for Mobile Communications (GSM), TIA/EIA-136, cdmaOne, cdma2000, UMTS, Wideband CDMA, and BLUETOOTH.

Figure 2:
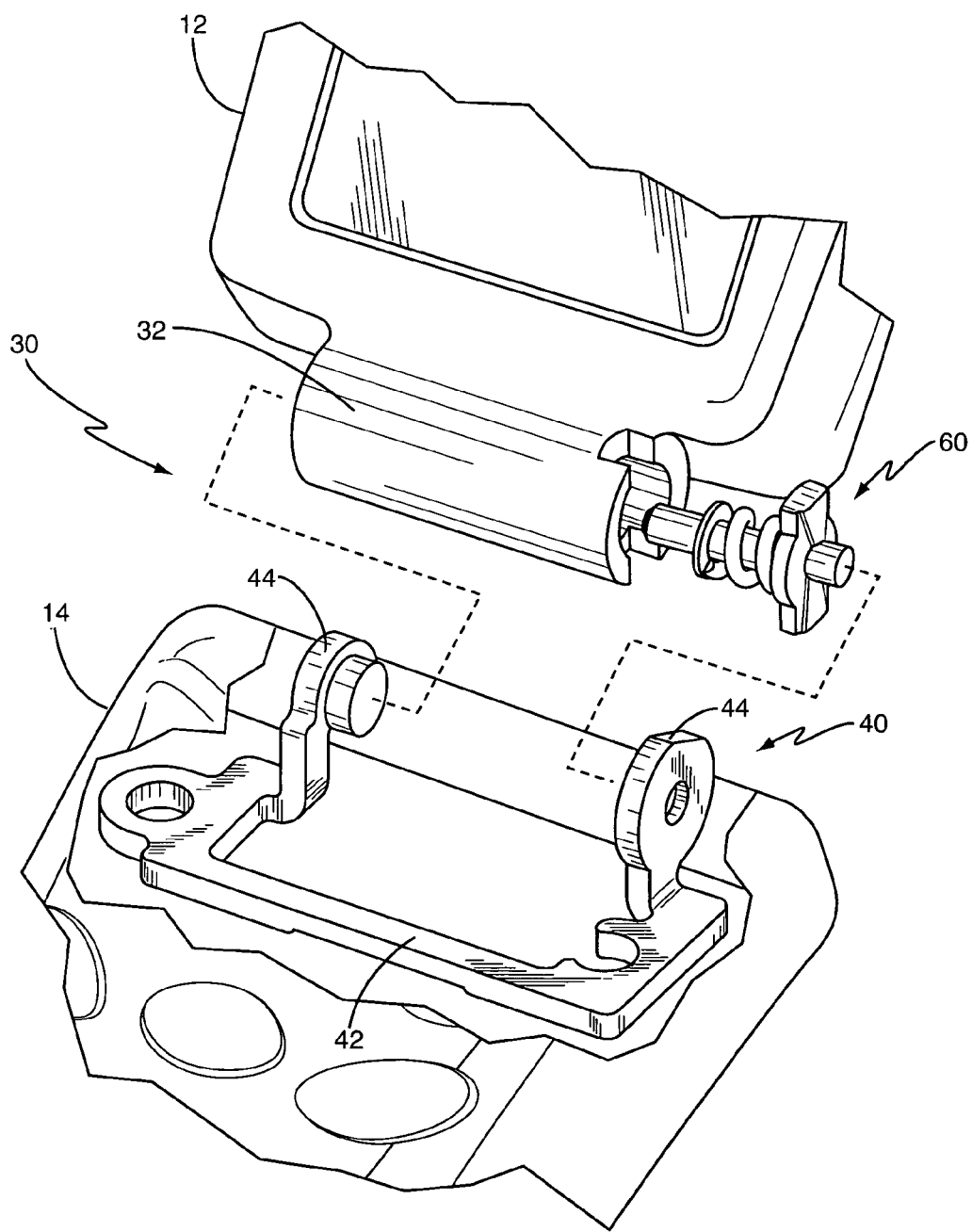
FIG. 2 illustrates an exploded view of one embodiment of the present invention.

FIG. 2 is an exploded view illustrating some of the component parts of the hinge mechanism 30 that pivotably connect the first and second housings 12, 14. In particular, the first housing 12 includes an integrally formed sleeve 32 that receives a pivot mechanism 60. A bracket 40 having a base 42 and a pair of opposing posts 44 fixedly attaches to the second housing 14. The sleeve 32 connects on one side to one of the posts 44, while the pivot mechanism 60 within the sleeve 32 connects to the other of the posts 44. Once assembled, the first and second housings 12, 14 pivot relative to each other between the open and closed positions on the pivot mechanism 60.

Figure 3A:
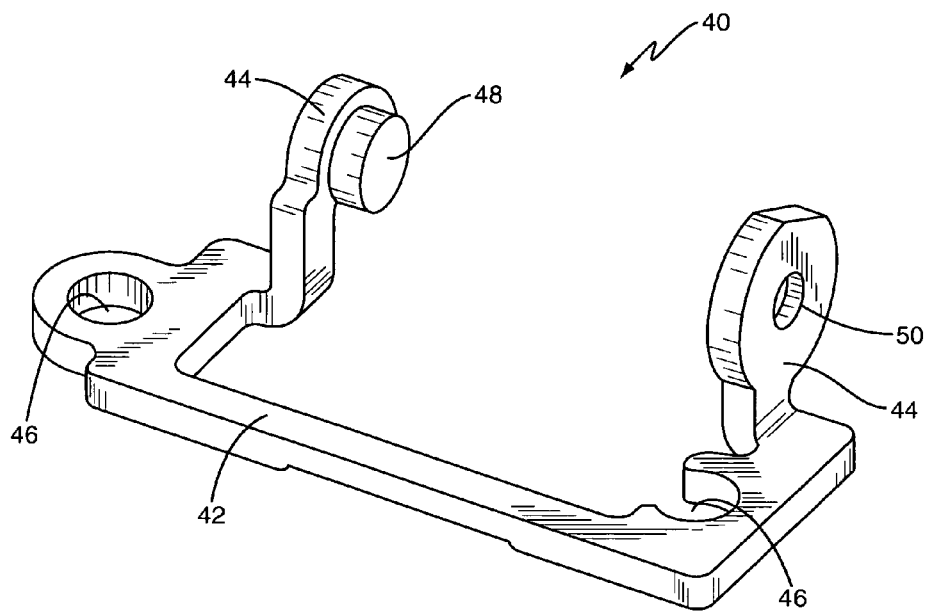
FIG. 3 illustrates a bracket according one embodiment of the present invention.
Figure 3B:
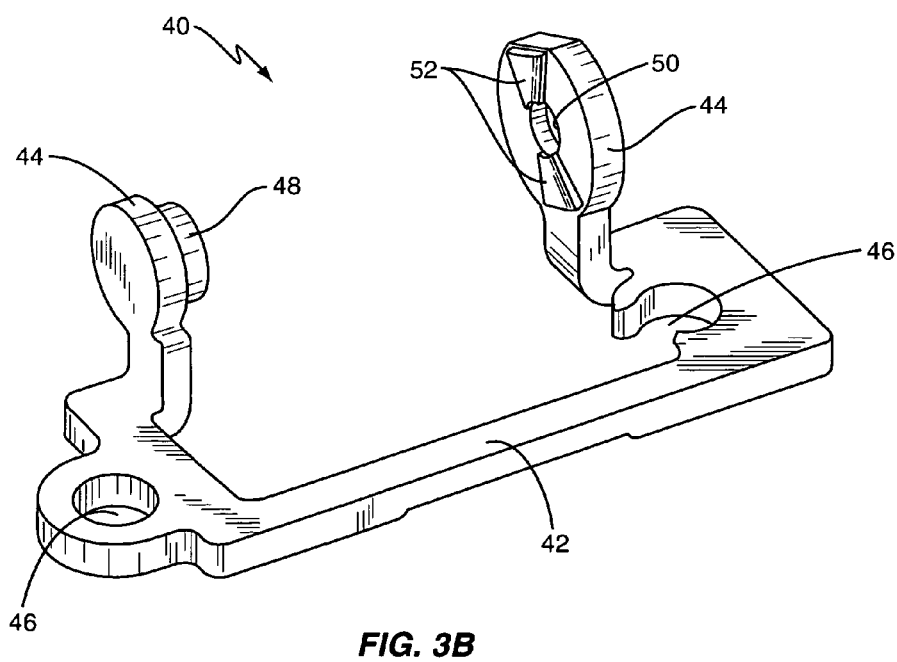
Figure 4:
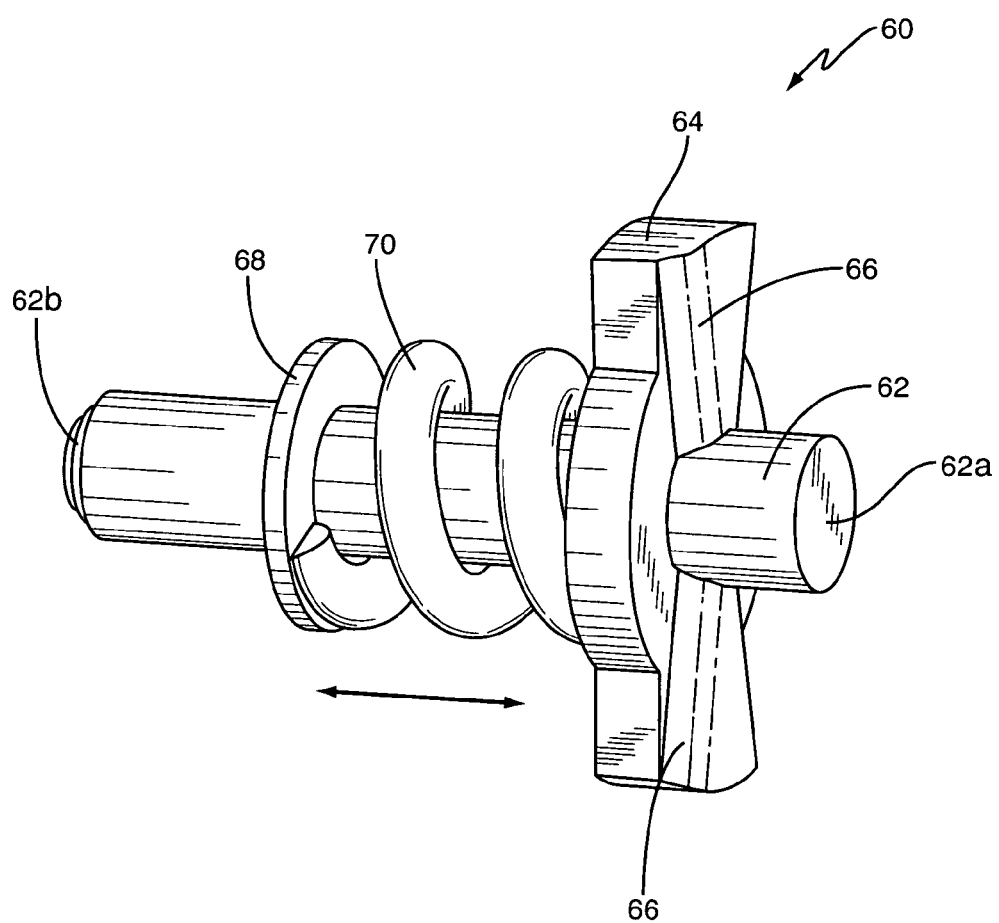
FIG. 4 illustrates a floating shaft and biasing member that according to one embodiment of the present invention.

FIGS. 3 and 4 illustrate the component parts of the bracket 40 and the pivot mechanism 60 in more detail. As seen in FIGS. 3A and 3B, the opposing posts 44 of bracket 40 are integrally formed with the base 42. One of the posts 44 includes a pivot support member, such as boss 48, sized to rotatably fit within the interior of sleeve 32. The opposing post 44 includes opening 50 that receives one end of a floating shaft included with pivot mechanism 60. According to one embodiment of the present invention, the pivot support member pivotably supports the first housing 12 independently of the pivot mechanism 60. In addition, bracket 40 also includes a cam surface that, in one embodiment, comprises a detent 52. Detent 52 may be formed, for example, as raised surfaces that cooperate with corresponding detents associated with the pivot mechanism 60.

Bracket 40 may be fixedly attached to the second housing 14 by any means known in the art. In one embodiment, however, mechanical fasteners (not shown) fit through one or more openings 46 to connect bracket 40 to the second housing 14. In alternate embodiments, bracket 40 may be formed integrally with the second housing 14.

FIG. 4 illustrates one embodiment of the pivot mechanism 60. Pivot mechanism 60 comprises a floating shaft 62, a cam member 64, an optional retainer 68, and a biasing system, which in FIG. 4 comprises biasing member 70. Floating shaft 62 comprises a substantially cylindrical member manufactured from any material known in the art, such as metal, metal alloy, or plastic. Floating shaft 62 has two ends 62a and 62b. The first end 62a mates with the corresponding opening 50 formed in post 44 of bracket 40, while the opposite end 62b of floating shaft 62 fits into the interior of sleeve 32. When assembled, the first and second housings 12, 14 pivot about the floating shaft 62 relative to each other. In addition, the floating shaft 62 also moves axially within sleeve 32 as will be described in more detail below.

Cam member 64 is engaged with the floating shaft 62. In this embodiment, cam member 64 is fixedly mounted to the end 62a of the floating shaft 62. However, as seen in more detail below, fixedly mounting cam member 64 to the floating shaft 62 is not required. As seen in FIG. 4, floating shaft 62 inserts through a central opening formed in cam member 64, and is press-fit onto floating shaft 62. This allows cam member 64 to rotate with floating shaft 62 when the user opens and closes the first and second housings 12, 14 of cellular telephone 10. However, other methods known in the art, such as welding, may be employed to fixedly mount cam member 64 to floating shaft 62.

Cam member 64 also includes a cam surface. In one embodiment, the cam surface comprises one or more detents 66 integrally formed as ramped or raised surfaces. In operation, the detents 66 cooperate with detents 52 on post 44 to provide a yielding resistance against opening and closing cellular telephone 10. In particular, detents 52 and 66 contact each other when the user pivots the first and second housings 12, 14 relative to each other. The detents 52, 66 resist the pivoting movement, but are configured to yield when the user applies a predetermined amount of force. In one embodiment, for example, the detents 66 are raised 0.5 mm from the surface of the cam member 64.

Biasing member 70 is slidingly engaged with the floating shaft 62, and is positioned between the optional retainer 68 and cam member 64. As seen in more detail below, optional retainer 68 may abut a surface within the interior of sleeve 32 to prevent the optional retainer 68 from moving along the axial length of floating shaft 62. Additionally, the optional retainer 68 may be movably engaged with floating shaft 62. As seen in FIG. 4, biasing member 70 comprises a helical spring that slidingly engages the floating shaft 62. However, the present invention is not so limited. Those skilled in the art will appreciate that any object capable of providing a biasing force may be used in lieu of, or in addition to, the illustrated spring.

According to the present invention, the biasing member 70 compresses to allow the "inward" axial movement of floating shaft 62 and cam member 64. This inward axial movement (i.e., away from the opening 50 on post 44) facilitates assembly of the first and second housings 12, 14 by allowing a user to align the end 62a of floating shaft 62 with the opening 50.

In addition, the biasing member 70 also decompresses to bias the floating shaft 62 and cam member 64 axially "outward" (i.e., towards opening 50 on post 44). Particularly, when cellular telephone 10 is fully assembled, biasing member 70 will be in a partially compressed state on floating shaft 62 such that it tends to bias the cam member 64 and the floating shaft 62 axially outward. This biasing force causes end 62a to enter into, and remain contained within, the opening 50. Further, the biasing force causes the detents 66 to contact the detents 52 formed on post 44. This provides the force necessary to allow detents 52 and 66 to yieldingly resist the pivoting movement imparted by the user when moving the first and second housings 12, 14 between the open and closed positions.

Figure 5A:
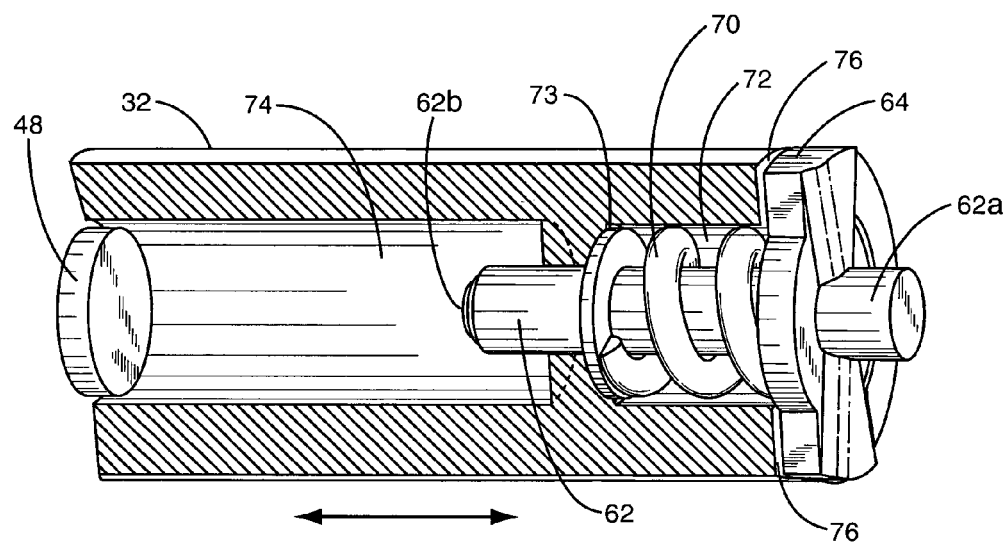
FIGS. 5A-5B illustrate a sectional perspective view of one embodiment of the present invention.
Figure 5B:
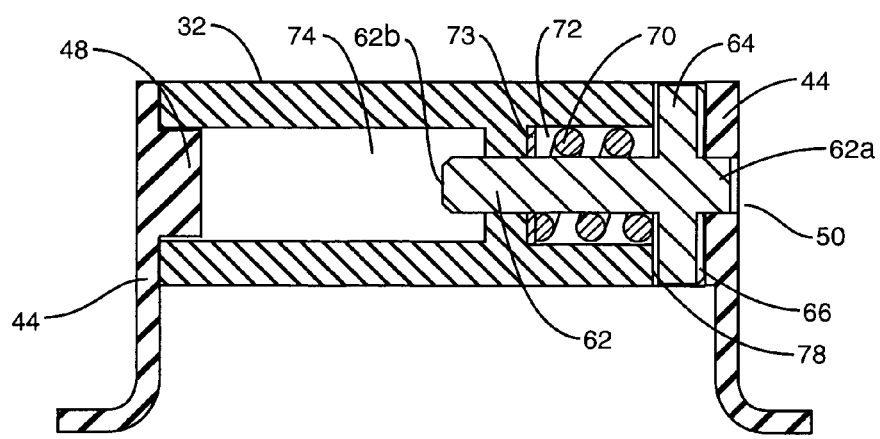

FIGS. 5A-5B illustrate how the pivot mechanism 60 might couple to the cellular telephone 10 according to one embodiment of the present invention. Particularly, the sleeve 32 formed in the first housing 12 includes a recess 72 and a bore 74. The floating shaft 62, the optional retainer 68, and the biasing member 70 insert into recess 72 such that they are disposed within sleeve 32 after assembly of the cellular telephone 10. The boss 48 inserts into bore 74. Recess 72 has a rigid rear wall 73 that abuts optional retainer 68. However, because retainer 68 is optional, biasing member 70 may alternatively contact rear wall 73 directly. The rear wall 73 provides a rigid surface against which biasing member 70 "pushes" during compression and decompression.

Depending upon the shape of cam member 64, sleeve 32 may also include one or more notches 76 shaped to receive cam member 64. The notches 76 provide a space into which cam member 64 may move when biasing member 70 is compressed. In addition, the end 62b of floating shaft 62 may pass through an opening in rear wall 73 and into the bore 74. The bore 74 provides a space into which a portion of floating shaft 62 may move when biasing member 70 is compressed.

Figure 6A:
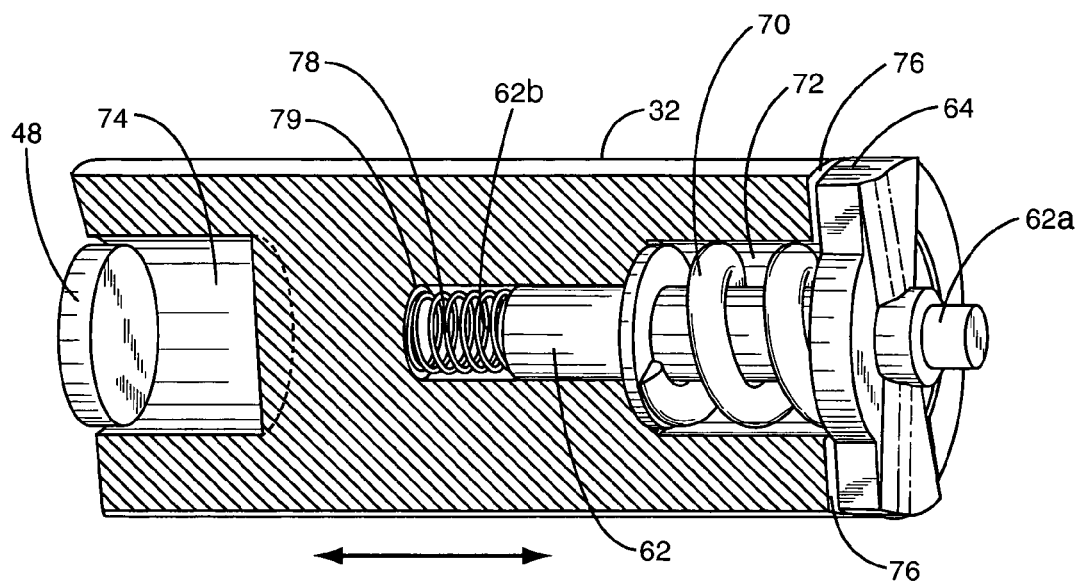
FIGS. 6A-6B illustrate a sectional perspective view of an alternate embodiment of the present invention.
Figure 6B:
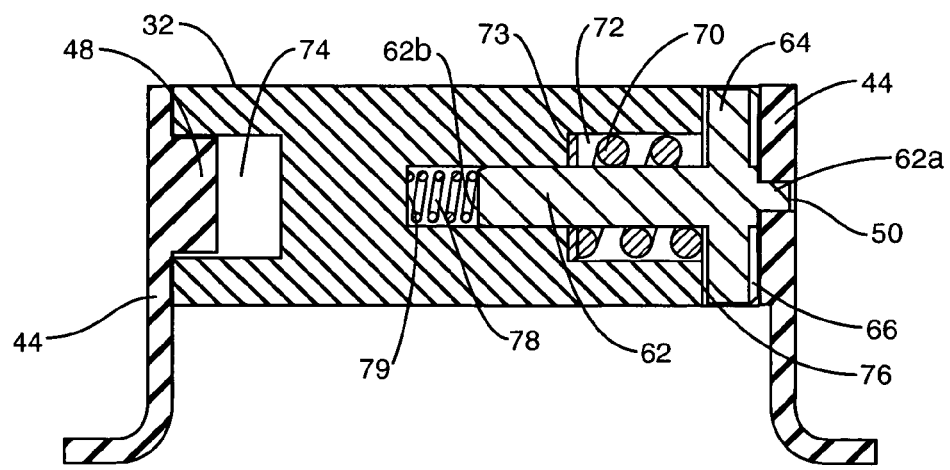

FIGS. 6A-6B illustrate an alternate embodiment of the present invention wherein the pivot mechanism 60 comprises a biasing system that includes a pair of biasing members 70 and 78. Both biasing members 70 and 78 are shown herein as being helical springs. However, the present invention may employ any member known in the art that compresses and decompresses to allow axial movement of the floating shaft 62 and the cam member 64.

In this embodiment, the end 62a of floating shaft 62 has a diameter that is smaller than that of the rest of floating shaft 62. Particularly, the diameter of the end 62a of floating shaft 62 is sized to pass through opening 50, while the diameter of the remaining portion of floating shaft 62 is not. In addition, the cam member 64 slidingly mounts to floating shaft 62. Because cam member 64 is not fixedly mounted on the floating shaft 62, one of the biasing members 70, 78 provides a first biasing force for the yielding resistance, while the other of the biasing members 70, 78 provides a second, substantially independent biasing force for maintaining the pivotable connection between the first and second housings 12, 14.

In FIGS. 6A-6B, for example, biasing member 70 is disposed within recess 72, and biases cam member 64 axially outward such that the cam member 64 engages the post 44 on bracket 40. Cam member 64 is slidingly mounted on floating shaft 62, and is disposed at least partially within notches 76 such that cam member 64 moves with the first housing 12. When the user pivots the first and second housings 12, 14, the cam member 64 pivots with the first housing 12, and biasing member 70 biases detents 52, 66 into contact to yieldingly resist the pivoting movement.

Because cam member 64 is not fixedly mounted on the floating shaft 62, biasing member 70 does not substantially bias the floating shaft 62 toward opening 50. Therefore, biasing member 78 imparts the second biasing force that biases the floating shaft 62 axially outward, and causes the end 62*a* of floating shaft 62 to enter into, and remain contained within, the opening 50. Therefore, biasing member 78 provides the biasing force necessary to maintain the pivotable connection between the first and second housings 12, 14. As seen in FIGS. 6A-6B, biasing member 78 may be fixedly attached to the end 62*b* of floating shaft 62 and contacts rear wall 79. As above, rear wall 79 provides a rigid surface against which biasing member 78 "pushes" during compression and decompression.

Figure 7:
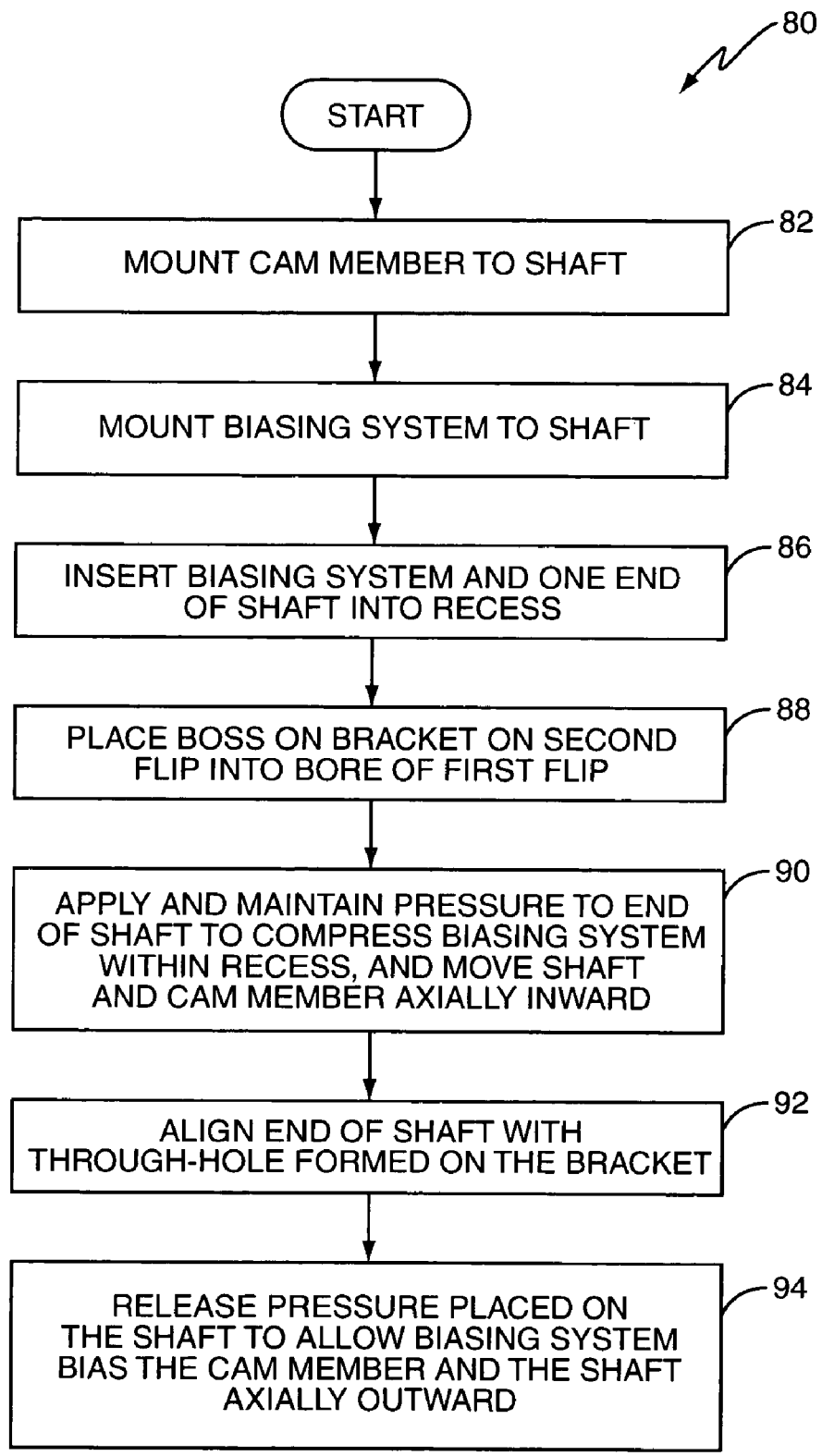
FIG. 7 illustrates a method by which an electronics device might be assembled to include a hinge according to one embodiment of the present invention.

FIG. 7 illustrates a method 80 of assembling the pivot mechanism 60 and cellular telephone 10 according to one embodiment of the present invention. The method begins by mounting the cam member 64 to the floating shaft 62 (box 82). The cam member 64 should be positioned such that the detents 66 face outwardly towards the detents 52 on bracket 40. However, depending upon the embodiment, cam member 64 may or may not be fixedly mounted on the floating shaft 62. The biasing member 70 may then be slidingly mounted on the floating shaft 62 while biasing member 78, when used, is fixedly mounted to the end 62*b* of floating shaft 62 (box 84). The end 62*b* of floating shaft 62 and biasing member 70 are placed into the recess 60 of first housing 12 (box 86). The boss 48 formed on bracket 40 is inserted into the bore 78 (box 88).

An assembler then applies an inward pressure to the end 62*a* of floating shaft 62 to compress the biasing member 70 within the recess 60. In embodiments where cam member 64 is fixedly mounted on the floating shaft 62, the user-applied inward pressure compresses biasing member 70 and causes the cam member 64 and the floating shaft 62 to move axially inward (box 90). In embodiments where cam member 64 is not fixedly mounted on the floating shaft 62, the user-applied compression causes only the floating shaft 62 to move axially inward.

The amount of compression that is required may depend upon any number factors, such as the characteristics of biasing member 70 and/or biasing member 78, and the size and shape of detents 66, 44. Once compressed, however, the end 62*a* of floating shaft 62 is aligned with the opening 50 formed in post 44 of bracket 40 (box 92). Releasing the applied inward pressure allows the biasing member 70 and/or 78 to decompress, thereby biasing the cam member 64 and the floating shaft 62 axially outward. This causes the end 62*a* of floating shaft 62 to enter into opening 50, and the cam member 64 to contact post 44 (box 94). Because biasing member 70 and/or 78 do not completely decompress, one or both of biasing members 70, 78 provide the continuing biasing force necessary to operate the detent mechanism, and to maintain the integrity of the pivotable connection between the first and second housings 12, 14.

It should be noted that the description and the drawings describe the present invention in terms of pivotably connecting the two housings 12, 14 of a cellular telephone 10. However, this is for illustrative purposes only. Those skilled in the art will readily appreciate that one or more hinge mechanisms of the present invention may pivotably connect two or more housings of any electronics device. Some examples of such suitable devices include, but are not limited to, laptop and notebook computing devices, mobile communications devices, and personal electronics devices such as Personal Digital Assistants (PDAs), calculators, and the like.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An electronics device comprising:
  a first housing pivotally connected to a second housing; and
  a hinge mechanism to pivotally connect the first and second housings, the hinge mechanism comprising:
    a floating shaft configured to move axially in first and second opposing directions within the first housing;
    a bracket associated with the second housing, the bracket having a cam surface and an opening formed to receive an end of the floating shaft;
    a cam member mounted to the floating shaft and being axially moveable with the floating shaft in the first and second directions, the cam member having a cam surface; and
    a biasing system configured to permit the floating shaft and the cam member to move axially in the first direction, and to bias the floating shaft and the cam member axially in the second direction such that the cam surface on the cam member engages the cam surface on the bracket to generate a yielding resistance that resists pivoting at least one of the first and second housings.

2. The electronics device of claim 1 wherein the biasing system comprises a biasing member that biases the cam member and the floating shaft axially in the second direction to maintain the pivotable connection between the first and second housings.

3. The electronics device of claim 2 wherein the opening in the bracket receives the end of the floating shaft when the biasing member biases the cam member and the floating shaft in the second direction.

4. The electronics device of claim 1 wherein the floating shaft pivotably supports the first housing about one end of the hinge mechanism, and wherein the bracket includes a pivot support member independent of the floating shaft that pivotably supports the first housing opposite the floating shaft.

5. The electronics device of claim 1 wherein the biasing system and at least a portion of the floating shaft are disposed within a sleeve formed within the first housing.

6. The electronics device of claim 5 further comprising a retainer associated with the floating shaft, and disposed within the sleeve.

7. The electronics device of claim 5 wherein the sleeve receives a portion of the cam member when the cam member and the floating shaft move axially in the first direction.

8. The electronics device of claim 1 wherein the biasing system includes a first biasing member configured to bias the cam member axially in the first direction and to allow the cam member to move axially in the second direction, and a second biasing member configured to bias the floating shaft axially in the first direction and to allow the floating shaft to move axially in the second direction.

* * * * *